(12) United States Patent
Hoberock

(10) Patent No.: US 7,586,654 B2
(45) Date of Patent: Sep. 8, 2009

(54) SYSTEM AND METHOD OF ADDING MESSAGES TO A SCANNED IMAGE

(75) Inventor: Tim Mitchell Hoberock, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1296 days.

(21) Appl. No.: 10/269,210

(22) Filed: Oct. 11, 2002

(65) Prior Publication Data

US 2004/0070614 A1 Apr. 15, 2004

(51) Int. Cl.
*H04N 1/04* (2006.01)
*H04N 1/387* (2006.01)
*H04N 1/00* (2006.01)

(52) U.S. Cl. .............. 358/474; 358/403; 358/444; 358/442; 358/450; 358/497

(58) Field of Classification Search ........... 358/474, 358/497, 494, 442, 450, 403, 404, 444, 505, 358/524; 382/305, 306, 312, 318, 319, 314, 382/315

See application file for complete search history.

(56) References Cited

U.S. PATENT DOCUMENTS

| | | | |
|---|---|---|---|
| 4,866,539 A | 9/1989 | Marazzi et al. | |
| 5,105,186 A | 4/1992 | May | |
| 5,555,099 A * | 9/1996 | Telle | 358/401 |
| 5,633,660 A | 5/1997 | Hansen et al. | |
| 5,737,454 A * | 4/1998 | Park et al. | 382/284 |
| 5,818,430 A | 10/1998 | Heiser | |
| 5,835,577 A | 11/1998 | Disanto et al. | |
| 6,163,313 A | 12/2000 | Aroyan et al. | |
| 6,362,465 B1 * | 3/2002 | Oliver | 250/208.1 |
| 6,532,349 B1 * | 3/2003 | Todome | 399/81 |
| 6,891,633 B1 * | 5/2005 | Hayward et al. | 358/1.15 |
| 7,042,594 B1 * | 5/2006 | Dawe et al. | 358/2.1 |
| 2002/0051262 A1 * | 5/2002 | Nuttall et al. | 358/537 |
| 2003/0147099 A1 * | 8/2003 | Heimendinger et al. | 358/462 |

FOREIGN PATENT DOCUMENTS

| | | |
|---|---|---|
| EP | 0232905 | 8/1987 |
| GB | 2357209 | 6/2001 |
| GB | 2376588 | 12/2002 |
| WO | WO93/14458 | 7/1993 |

* cited by examiner

*Primary Examiner*—Cheukfan Lee

(57) ABSTRACT

A method of annotating a document on a scanner while generating an electronic representation of that document preferably includes: receiving an electronic representation of a hardcopy document from a scanner bed of the scanner, receiving material to be added to a scanned document from a user interface integrated with the scanner, and adding the material from the user interface to the electronic representation of the hardcopy document to produce an annotated electronic document.

24 Claims, 5 Drawing Sheets

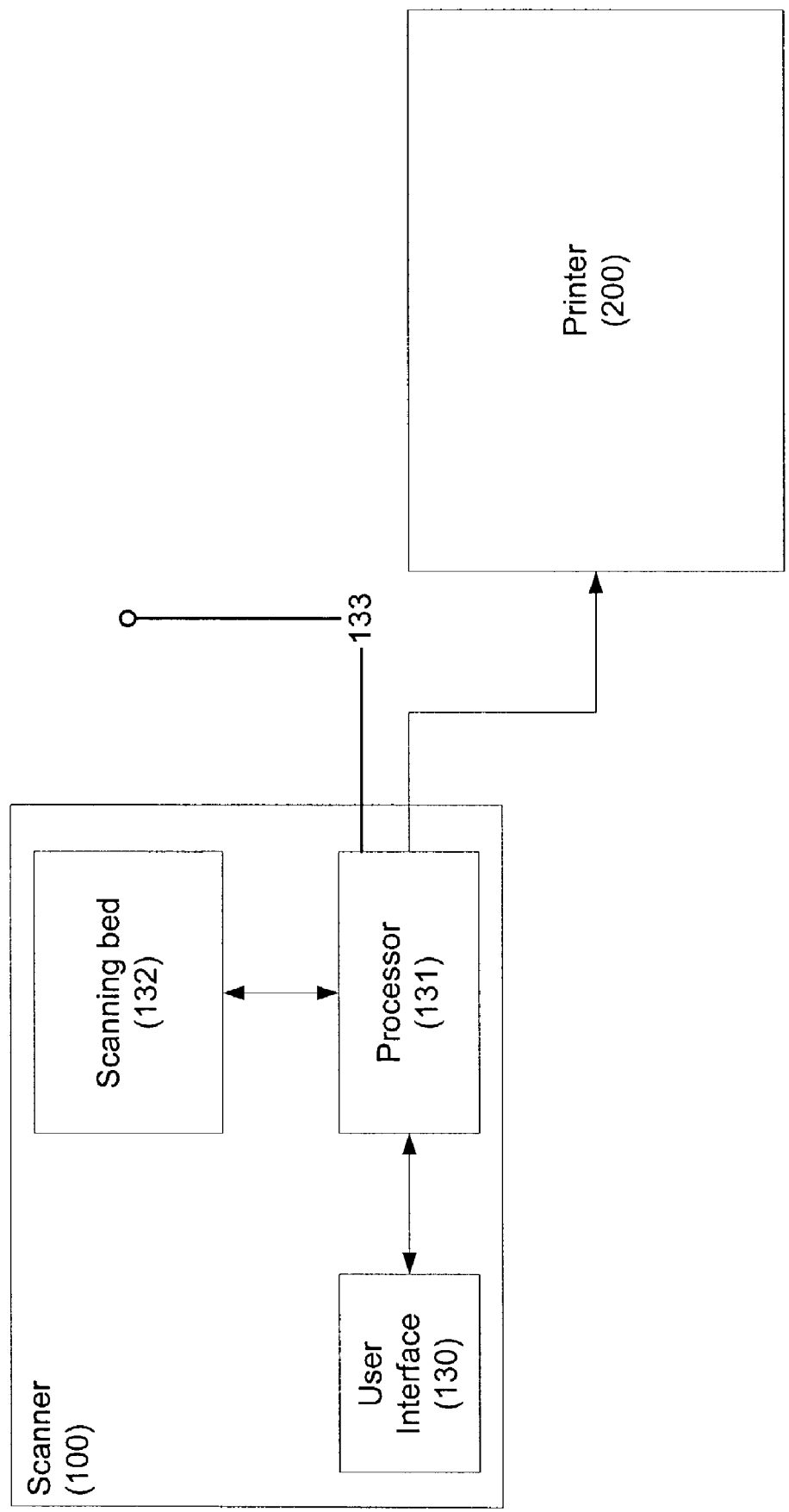

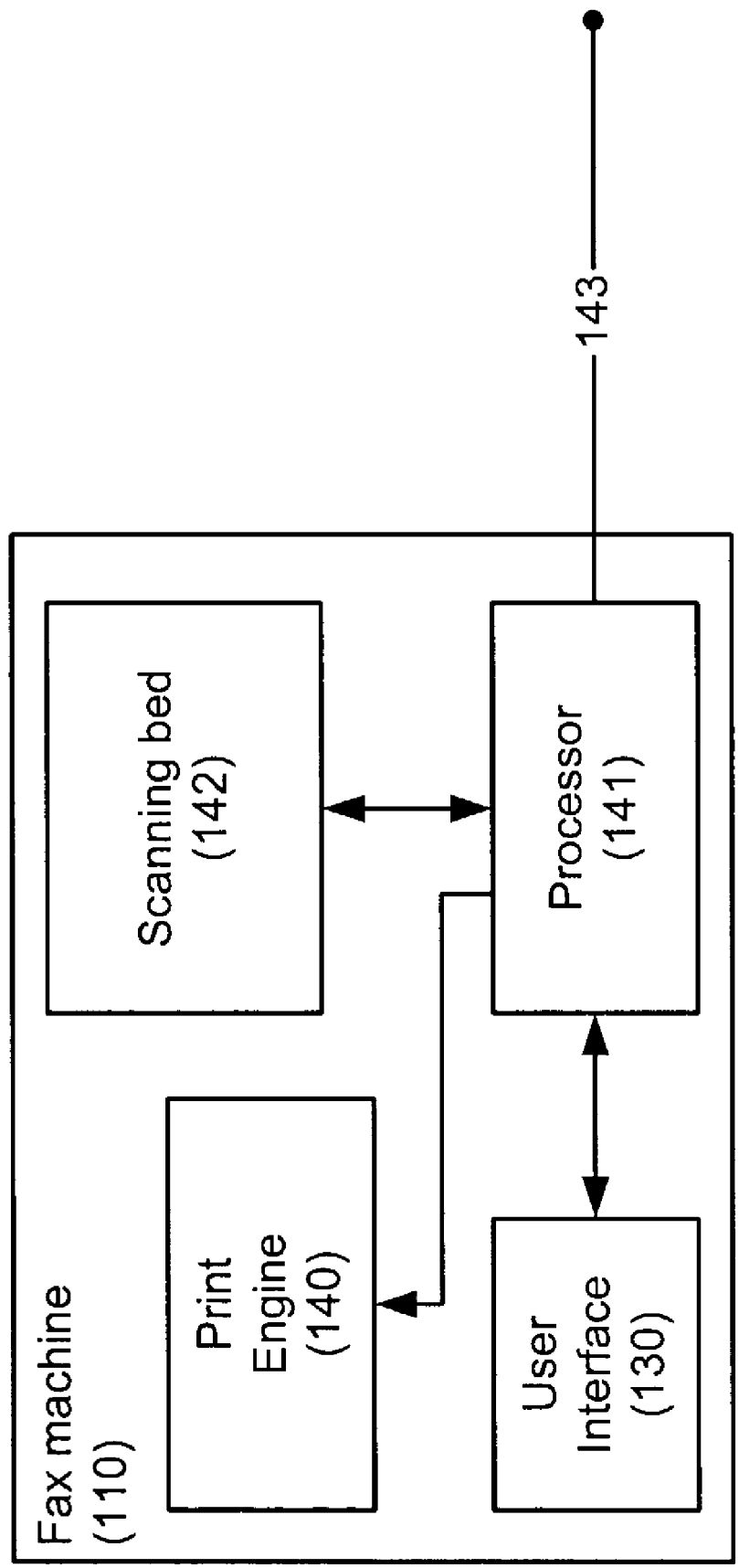

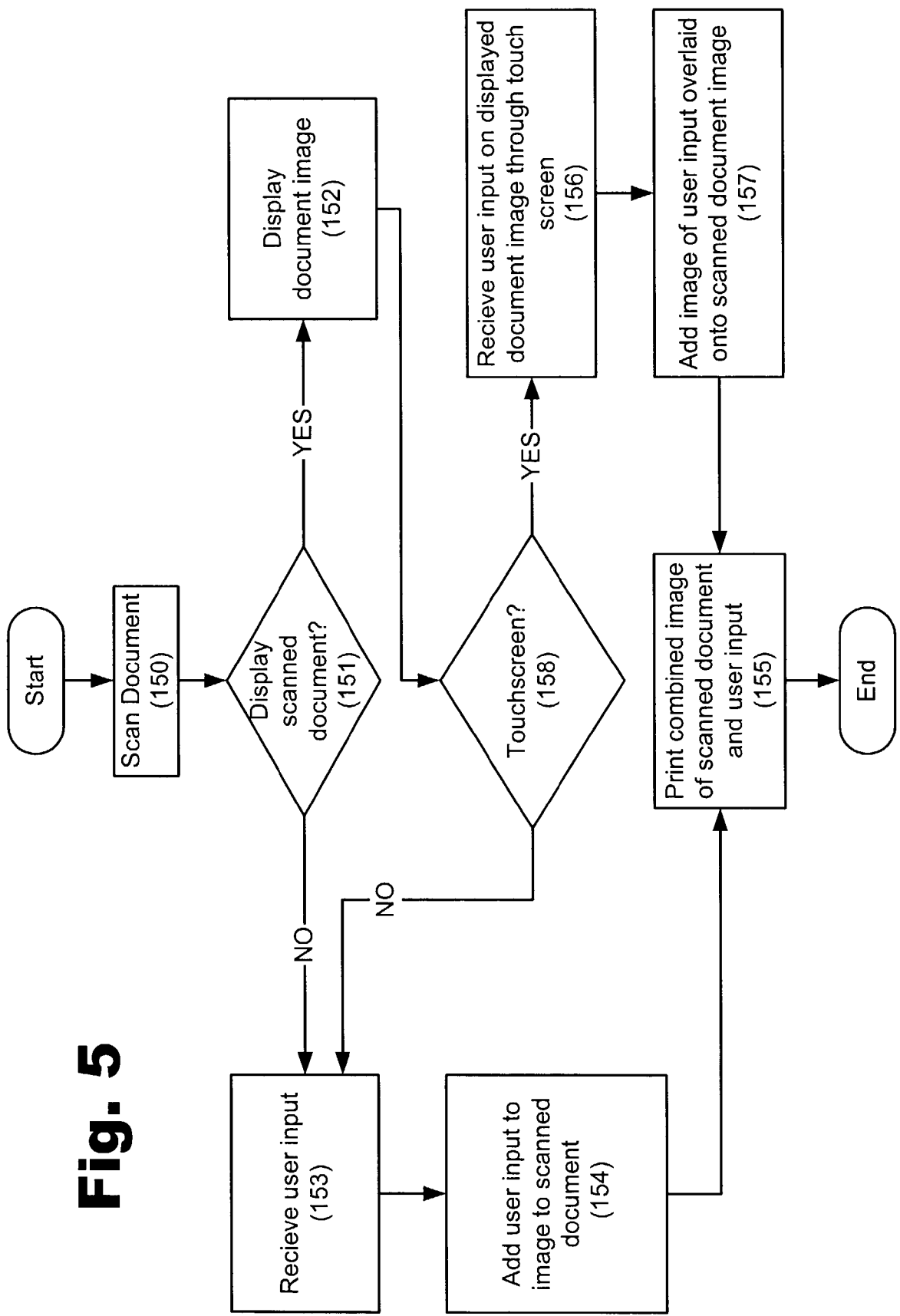

SYSTEM AND METHOD OF ADDING MESSAGES TO A SCANNED IMAGE

BACKGROUND

An optical scanner is a device that is used to obtain an electronic representation of a document, for example, a printed page of text, a graphic or photograph. This electronic representation of the hardcopy document can then be stored or transmitted electronically for a wide variety of purposes.

The scanner typically exposes the hardcopy original to a bright light. A photosensitive element records the light reflected from the hardcopy original one line at a time and outputs an electronic signal representative of the image on the hardcopy original. This signal can be recorded in an electronic file, such as on a personal computer, to create an electronic version of the hardcopy original. Alternatively, the scanner may be incorporated into a fax machine and the signal may be transmitted via a phone line to convey the electronic version of the hardcopy original to a recipient fax machine where a new hardcopy is printed. With some scanners, an application known as optical character recognition (OCR) may be able to turn scanned text into editable text for a word processing application.

Often, a user may desire to add a message or annotations to a scanned image before the scanned image is transmitted, printed or saved. Some users have chosen to hand write messages, notes or annotations directly on the hardcopy original before the original is scanned. Consequently, when the original is then scanned, the additions made by the user are included as part of the electronic file representing the hardcopy original that is created by the scanner. Thus, when the file is transmitted or printed, the handwritten annotations will be included.

Unfortunately, this approach requires that the user mark up the original document with the handwritten annotations. In many instances, the user may prefer to keep the original document clean of any such markings.

As an alternative, the user can make a copy of the original and then markup and scan the copy as desired. However, this requires the extra step and resources of making a hardcopy duplicate of the original document.

BRIEF DESCRIPTION OF THE DRAWINGS

The accompanying drawings illustrate embodiments of the principles described herein and are a part of the specification. Together with the following description, the drawings demonstrate and explain the principles described herein. The illustrated embodiments are examples and do not limit the scope of the invention.

FIG. 3 illustrates the interior components of an embodiment in which a scanner with a user interface is connected to a printer.

FIG. 4 illustrates the interior components of an embodiment in which a user interface is integrated with a facsimile machine.

FIG. 5 is a flowchart illustrating a method according to an embodiment in which a user can add material to a scanned document through a user interface integrated with the scanner.

Throughout the drawings, identical reference numbers designate similar, but not necessarily identical, elements.

DETAILED DESCRIPTION

According to principles described herein, a user interface can be incorporated with a scanner to allow a user to add material, such as messages, notations, corrections, etc., to an electronic scanned image. In this way, no notations need be made on the original document that was scanned. The desired annotations are added to the electronic version of the document prior to storage or transmission, while the original hardcopy document is not marked up.

Figure 1:
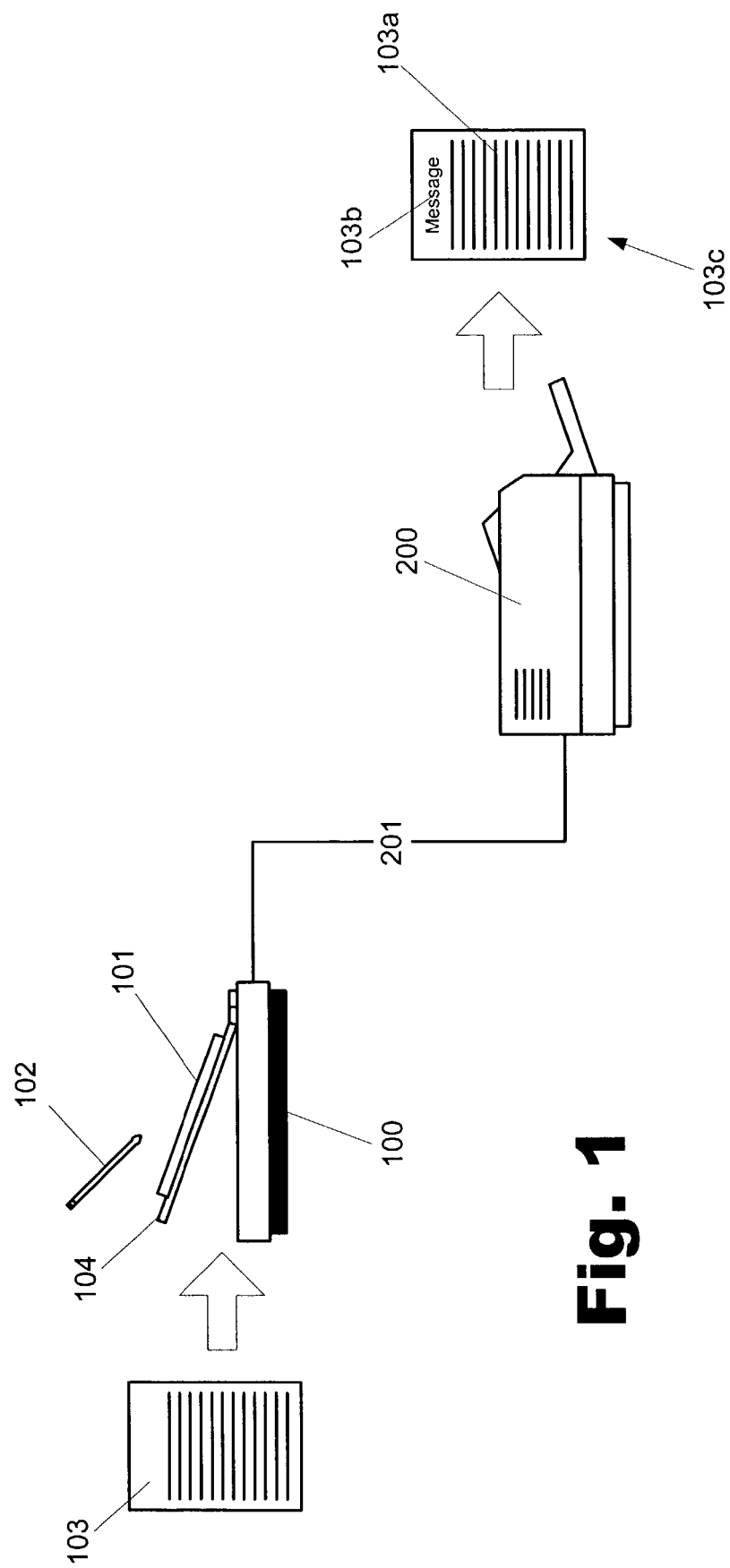
FIG. 1 illustrates an embodiment in which a scanner with a user interface is used to create an electronic image of a hardcopy original to which additional material is added through the user interface.

Turning now to FIG. 1 of the drawings, FIG. 1 illustrates a scanner (100) that incorporates a user interface (101) for adding material electronically to a scanned image. In the embodiment of FIG. 1, the user interface (101) is preferably a touch screen.

A touch screen is a preferred user interface for this application because of its compact size and flexibility in receiving user input. However, as will be discussed below, other user input devices can be used.

In the embodiment of FIG. 1, the scanner (100) is a flat scanner with a lid (104) that covers a document (103) being scanned. The lid (104) of the scanner (100) encloses the document so that the bright light the scanner (100) uses to produce an image of the document will be unaffected by ambient light.

With a flat scanner, the document (103) remains stationary during scanning while a light source and imaging device are moved along the document, typically along its length. A document feeder (not shown) could be incorporated into the lid of the scanner (100) to automatically handle the scanning of multi-page documents.

Alternatively, a rotary scanner could be used in an embodiment of the present invention. A rotary scanner feeds the pages of the document being scanned past a stationary light source and imaging device. A rotary scanner may also incorporate a document feeder to handle multiple pages of a document.

While the embodiment of FIG. 1 illustrates a flat scanner, the principles described herein are equally applicable to either a flat or rotary scanner. As used herein, and in the appended claims, the term "scanner bed" will be used to refer to the operative parts of either a flat or rotary scanner.

As shown in FIG. 1, the user interface (101), e.g., the touch screen, is preferably disposed on the scanner lid (104). The touch screen (101) is disposed on the lid (104) of the scanner (100). This arrangement is space efficient. Moreover, the user interface can be oriented in a manner that corresponds with the orientation of the document (103) in the scanner so that the user can more readily grasp the orientation of the resulting scanned image that is preferably displayed by the user interface (101). The user can then more readily input and place additional material on the scanned image. As noted, this additional material may include a message (hand-written or typed), annotations, drawings, edits, commentary, etc.

If a touch screen is used as a component of the user interface (101), a stylus (102) may also be provided for operating the touch screen. The stylus is preferably a hard object that resembles a writing instrument and can be used to select displayed options on the touch screen or write or draw material on the touch screen that will be captured and added to the electronic representation of the document (103) output by the scanner (100). Typically, a stylus is made of plastic and has a rounded end that will not scratch the surface of the touch screen (101) when pressure is applied. It should be understood, however, that the stylus (102) is not strictly necessary and that the touch screen (101) can be operated with a user's finger or fingers rather than with a stylus.

As indicated and consistent with the embodiment of FIG. 1, the touch screen is a well-suited device for use in a user interface according to the principles described herein. Touch screens are becoming more and more prevalent in today's technological society as a component of the user interface for an electronic device or system. Typically, a touch screen consists of a display device, for example, a cathode ray tube or a liquid crystal display, and some device associated with the display which is sensitive to the presence or pressure of, for example, a finger or a stylus, and can distinguish where on the display the finger or stylus is applied.

Touch screens are used in a wide variety of devices such as automatic teller machines (ATM's), information kiosks, personal digital assistants (PDA's) and photocopiers. As a user input device, touch screens provide great flexibility. A touch screen can provide display a virtual keypad that can then be operated by a user. Alternatively, a touch screen can receive handwritten input from a user and translate stylus strokes into editable text, commands or an image of the handwriting or drawing.

Touch screens have been used, for example, to receive user input into a PDA, or to provide a user interface to electronically place a signature on an electronic document, such as receiving a signature from the user of a credit card when a purchase is made. Through touching the screen of a touch screen device, anyone can easily select an option from among a variety of displayed options or be able to add hand-written text or graphics to a document.

A touch screen is operated by touching a position on a screen that corresponds, for example, to a portion of the display that the user wishes to select, or by writing or drawing something the user wishes to be rendered in electronic form. The touch screen records the positional information of the touch or the writing/drawing and transmits the positional information to an associated computer or processor. The positional information is then translated by the computer or processor into commands that are then executed or data that is stored. The commands may be to navigate through a database or application or to generate an electronic representation of the user's input.

A touch screen is typically two-dimensional and may accordingly output positional information in a two-dimensional (x, y) coordinate system. There are several different methods by which the touch screen can detect the presence and movement of a finger or stylus across its surface. Those methods may include an infrared detection system that places a grid of infrared light beams over the surface of the touch screen. When some of the beams are broken by a finger or stylus being applied to the touch screen, the system can determine the position of the finger or stylus based on the particular beams that are broken. Other touch screens contain two layers of tiny transparent electrodes that when compressed together complete a circuit that sends a signal which can be translated as a single point on the (x, y) coordinate plane.

Touch screens are just one possible component of a user interface that can be utilized according to principles described herein to allow a user to add additional material to the electronic version of a scanned document. Other such possible components that could be used with or as an alternative to a touch screen include, but are not limited to, a display device such as an LCD, a keyboard or keypad, a trackpad or trackball, an electronic pen, or a mouse.

The operation of the system illustrated in FIG. 1 will now be described. An original document (103) is placed into the scanner (100) in the appropriate manner. The scanner lid (104) is then closed and the document is scanned. Through the use of a stylus (102), a hand-written message or other additional material (103b) can then be entered through touch screen (101). The image (103a) that was scanned from the original document (103) and the additional material (103b) are processed in the scanner (100) and are combined into one single image that contains both the image of the original document (103a) and the additional material (103b). The additional material (103b) can include hand-written messages or drawings, images, commentary, corrections, typed messages, annotations, or any other type of addition to the scanned image (103a). If a hand-written message is entered, it may be processed by an Optical Character Recognition (OCR) function and rendered as editable text or computer generated text. Alternatively, the user may select a pre-defined message or graphic from a menu of such for addition to the document (103).

Depending on the components of the user interface (101), the user may be able to enter the additional material in several ways, for example by typing on a keyboard or keypad or operating a touch screen. In the illustrated embodiment, the scan of the original document (103) is preferably displayed on the touch screen (101). The user can then view the scanned image on the touch screen (101) and place additional material (103b) anywhere on scanned image as desired. For example, using the stylus (102), the user could overlay additional material on the scanned image, including crossing out portions of the document and adding comments, corrections or explanations in available margins or between lines. The user could also write or draw material over existing text or graphics. This ready capability to allow the user to view a scanned document image and annotate it in a manner similar to a hardcopy is one reason that the touch screen is a well-suited component of embodiments described herein.

Alternatively, in other embodiments, there may be a designated field or fields in which additional material entered by the user will be placed. For example, the electronic image of the original document (103) may be reduced in size so as to only occupy a portion of a sheet of print medium. Then, any input the user provides through the user interface (101) can be placed in the remaining unoccupied portion of the available print space that is created by the reduction of the image of the original document (103).

Alternatively, those portions of the original document, which would typically be margins, may be designated to receive additional material entered by the user. For example, in FIG. 1, the additional material entered by the user (103b) is inserted into the top margin of the original document (103a) to generate the final document (103c) that includes both the original material (103a) and the added material (103b).

However, these are merely examples. The designated field for receiving additional user-entered material can be of any size and shape and placed anywhere in the final document.

In such embodiments where any added material is confined to a designated field or fields, the user may not see a display of the image of the scanned original document (103). Rather, the user may, for example, simply type in material that will be electrically added to the designated field of the scanned document. Or, if a touch screen is used as part of the user interface, anything written or drawn on the touch screen will be added to the electronic document and reproduced in the designated field of the electronic document.

Such embodiment would lend themselves to instances where the user is adding a signature to the document. The signature could be entered through the user interface, e.g., a touch screen, and then inserted into a designated field in the signature block of the scanned document.

The data that describes the finished document (103c), which contains both the original image (103a) and any user-entered additional material (103b), is then sent to a printer (200) which receives the information from the scanner (100) through, for example, a serial cable (201). Alternatively, the scanner and printer may be connected through a network, such as a Local Area Network (LAN), Wide Area Network (WAN), the Internet, etc. The data that is received from the scanner (100) is printed by the printer (200). The finished document (103c) is a hard copy of the information communicated from the scanner (100) to the printer (200), which is a combination of the original image (103a) and any user-entered additional material (103b).

Figure 2:
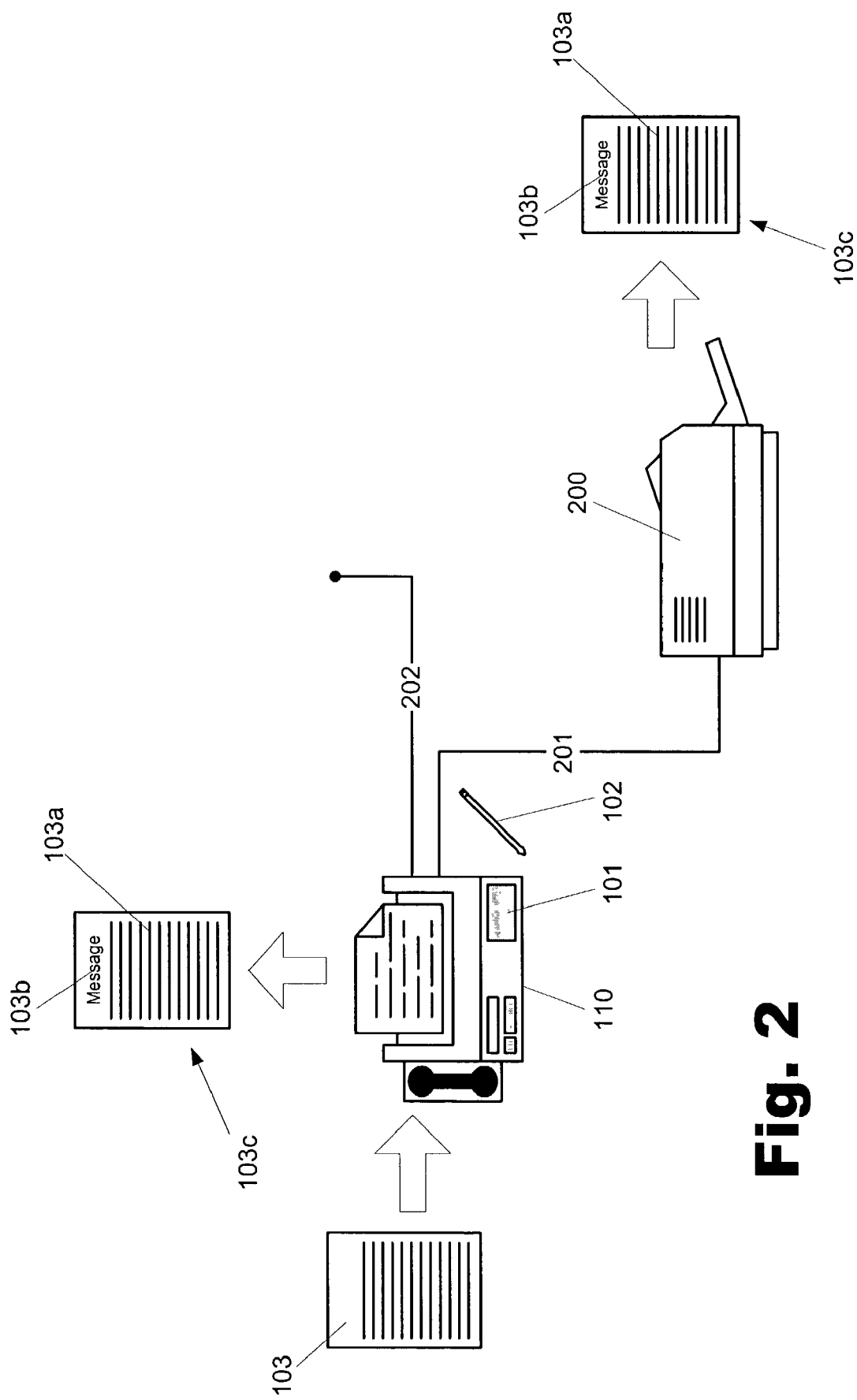
FIG. 2 illustrates an embodiment in which an image is produced with an accompanying message hand-written input through the use of a touch screen that is incorporated into the fax machine.

FIG. 2 is another embodiment that incorporates a user interface, for example, a touch screen (101) with a fax machine (110) so that material can be added to the scan of a hardcopy original prior to transmission as a facsimile. As shown in FIG. 2, the original document (103) is inserted into the fax machine (110) in the appropriate manner. The fax machine (110) scans the original document (103). A stylus (102) is then used to insert additional material (103b) onto the facsimile that is to be sent. The fax machine (110) will then produce a finished document (103c) that contains both the scanned image (103a) along with the additional material (103b).

The finished document can then be transmitted as a facsimile by the fax machine over a conventional phone line (202). The recipient will receive a fax, which is the scanned image, (103a) plus the additional material (103b) inserted by the user through the user interface.

As shown in FIG. 2, the fax machine (110) can print a hardcopy (103c) of the combined document including the original scanned image (130a) and the additional material (103b). Additionally, the finished document (103c) produced by the fax machine (110) can be directed to a printer (200) through a serial cable (201) or other type of cable. The advantages of having the finished document (103c) sent to the printer (200) is to allow for a faster, better quality hardcopy of the finished document (103c) than the user would get from the fax machine (110).

As will be appreciated, the user interface (101) for the fax machine (110) may not include a touch screen. All the possible user interface components and methods of adding material to a scanned document described above can be incorporated in the embodiment of FIG. 2. This includes the options of adding material to a designated field or at any point on the scanned document.

FIG. 3 illustrates the principal internal components of the embodiment illustrated in FIG. 1. As shown in FIG. 3, the scanner (100) preferably includes a scanning bed (132), a user interface (130), for example, a touch screen, and a processor (131). Touch screens are just one possible component of the user interface (130) that allows a user to add additional material to the electronic version of a scanned document. Other possible components that could be used with or as an alternative to a touch screen include, but are not limited to, a display device such as an LCD, a keyboard or keypad, a trackpad or trackball, an electronic pen, or a mouse. As described before, the scanner receives information from two different sources, the user interface (130) and the scanning bed (132) of the scanner (100).

An original document is scanned by the scanning bed (132). The user then operates the user interface, for example with a stylus, to input additional material that is to be added to the scanned document. The information collected from the user interface (130) and the scanning bed (132) is then sent to a processor (131) that processes the information so that the additional material and the scanned image are combined together to make one finished document.

The processor (131) controls the operation of the scanning bed (132) and communicates with the user through the user interface (130). After combining the information from the user interface (130) (or other user interface) and the scanning bed (132), the processor (131) preferably outputs the annotated document electronically to the printer (200). The printer (200) then produces a hard copy of the finished document.

Alternatively, the scanner (100) may be connected to a network (133), including the Internet. The processor (131) may store the electronic version of the annotated document locally or on the network for later use. The processor (131) may also e-mail the electronic version of the annotated document to a designated recipient. The user may designate a recipient through the user interface (130).

FIG. 4 illustrates the principal internal components of the embodiment of FIG. 2. As shown in FIG. 4, the fax machine (110) preferably includes a scanning bed (142), a user interface (130), for example, a touch screen, a processor (141) and a print engine (140).

Again, the scanning bed (142) of the fax machine (110) scans the original document. A stylus can then be used on the touch screen to insert additional material. Or, additional material can be entered through other operation of the components of the user interface.

The information collected from the scanning bed (132) and the user interface (130) is sent to a processor (141). The processor (141) is programmed to receive the information from the user interface (130) (or other user interface) and the scanning bed (142) of the fax machine (110); and combine the information into one electronic annotated document. The processor (141) is programmed to perform this function along with any other function needed to control the fax machine.

The annotated document can then be transmitted electronically as a facsimile via a phone line (143). Additionally or alternatively, the annotated document may be sent to the print engine (140) of the fax machine (110) and a hard copy of the annotated document produced.

FIG. 5 is a flow chart demonstrating a method according to which, for example, scanners and fax machines, such as those described above, are operated. First, the original document is scanned (150) by the scanning bed of, for example, either a scanner or a fax machine as seen in FIGS. 1 and 2.

Once the document is scanned, if the user interface includes a touch screen or a display device, there is an option to have the scanned document displayed (151). The document is then displayed (152) as indicated by the user. If the user interface does not include a touch screen or other display device, or if the user elects not to have the image of the scanned document displayed, user input for addition to the scanned document can still be received through the user interface (153).

If the user interface includes a touch screen (158), the user may then annotate the document on the touch screen (156), preferably while the document image is visible on the touch screen. This allows the user to place manually the handwritten annotations in any specific place on the scanned image.

In either case, the annotations or input made through the user interface are added to the electronic version of the original document (154, 157). This may include placing the annotated material in a designated field or overlaying the annotations on the face of the original document. The annotated document can then be printed (155) and/or stored or transmitted to a designated recipient.

The preceding description is intended to enable others skilled in the art to best utilize the principles disclosed in various embodiments and with various modifications as are suited to the particular use contemplated. It is intended that the scope of the invention be defined by the following claims.

What is claimed is:

1. A scanner for generating an electronic representation of a hardcopy document, said scanner comprising:
    a scanner bed including a flat scanner with a lid;
    a user interface for inputting material to be added to a scanned document, wherein said user interface comprises a touch screen disposed on said lid of the flat scanner; and
    a processor for receiving an electronic representation of a hardcopy document from said scanner bed and said material to be added to a scanned document from said user interface;
    wherein said processor adds said material from said user interface to said electronic representation of the hardcopy document to produce an annotated electronic document;
    wherein said processor displays an image of the hardcopy document on said touch screen using said electronic representation of the hardcopy document from the scanner bed; and
    wherein a user selectively adds said material at any point of said displayed image of said hardcopy document and said processor adds that material at a corresponding location within said annotated electronic document.

2. The scanner of claim 1, further comprising a connection to a printer for outputting said annotated electronic document for printing.

3. The scanner of claim 1, wherein said processor adds said material from said user interface to a designated field within said annotated electronic document.

4. The scanner of claim 1, further comprising a menu displayed on said user interface from which a user selects pre-established messages or graphics to be added to said scanned document.

5. A scanner for generating an electronic representation of a hardcopy document, said scanner comprising:
    a scanner bed;
    a user interface for inputting material to be added to a scanned document comprising an electronic touch-sensitive screen for displaying an image of said scanned document and accepting said user input material relative to said displayed image to be added to said scanned document; and
    a processor for receiving an electronic representation of a hardcopy document from said scanner bed and said material to be added to a scanned document from said user interface; and
    wherein said processor adds said material from said user interface to said electronic representation of the hardcopy document to produce an annotated electronic document.

6. The scanner of claim 5, wherein said user interface further comprises a stylus.

7. The scanner of claim 5, wherein said scanner bed is a flat scanner.

8. The scanner of claim 7, wherein said touch screen of said user interface is disposed on a lid of the flat scanner.

9. The scanner of claim 5, wherein said scanner bed is a rotary scanner.

10. The scanner of claim 5, further comprising a menu displayed on said user interface from which a user selects pre-established messages or graphics to be added to said scanned document.

11. A method of annotating a document on a scanner while generating an electronic representation of that document, said method comprising:
    receiving an electronic representation of a hardcopy document from a scanner bed of said scanner;
    receiving material to be added to a scanned document from a user interface integrated with said scanner;
    selecting said material from a menu of pre-established messages or graphics using the user interface;
    adding said material from said user interface to said electronic representation of the hardcopy document to produce an annotated electronic document;
    displaying an image of the hardcopy document on a display device of said user interface;
    displaying said image on a touch screen of said user interface;
    entering said material to be added with a stylus at any point on the displayed image of the hardcopy document; and
    adding said material to a corresponding location within said annotated electronic document.

12. The method of claim 11, further comprising printing said annotated electronic document with a printer connected to said scanner.

13. The method of claim 11, wherein entering said material further comprises writing or drawings on said touch screen with a stylus.

14. The method of claim 11, wherein said scanner is incorporated into a facsimile machine, said method further comprising transmitting said annotated electronic document as a facsimile.

15. The method of claim 11, further comprising adding said material from said user interface to a designated field within said annotated electronic document.

16. A facsimile machine including a device for annotating a document on a scanner while generating an electronic representation of that document, said device comprising:
    means for generating an electronic representation of a hardcopy document;
    means for receiving material to be added to a scanned document from a user;
    means for adding said material to said electronic representation of the hardcopy document to produce an annotated electronic document;
    means for transmitting by facsimile said annotated electronic document;
    means for printing a hardcopy of said annotated electronic document;
    a single device housing for containing and supporting all of said means;
    means for displaying an image of the hardcopy document while said means for receiving material to be added are being operated;
    means for entering said material at any particular point on the displayed image of the hardcopy document; and
    means for adding said material to a corresponding location within said annotated electronic document.

17. The machine of claim 16, said device further comprising means for printing said annotated electronic document.

18. The machine of claim 16, wherein said means for receiving material to be added to the scanned document comprise a touch screen.

19. The machine of claim 16, said device further comprising means for adding said material from said user interface to a designated field within said annotated electronic document.

20. The machine of claim 16, wherein said means for receiving material to be added to the scanned document comprise any of a display device, a keyboard, a keypad, a trackpad, a trackball, an electronic pen, and a mouse.

21. A set of computer-readable instructions stored on a medium for storing computer readable instructions, said instructions, when executed by a processor of a scanner, causing the processor to:

receive an electronic representation of a hardcopy document from a scanner bed of the scanner;

present a menu of pre-established messages or graphics using a user interface;

receive a selection from said menu indicating material to be added to a scanned document; and add said material to said electronic representation of the hardcopy document to produce an annotated electronic document;

display an image of the hardcopy document on a display device of the user interface; and add said material to said annotated electronic document at a location corresponding to a location on the displayed image of the hardcopy document referenced during input of said material.

22. The instructions of claim 21, further causing the processor to output said annotated electronic document to a printer connected to the scanner.

23. The instructions of claim 21, further causing the processor to transmit said annotated electronic document as a facsimile.

24. The instructions of claim 21, further causing the processor to add said material from said user interface to a designated field within said annotated electronic document.

* * * * *

UNITED STATES PATENT AND TRADEMARK OFFICE
CERTIFICATE OF CORRECTION

PATENT NO. : 7,586,654 B2  Page 1 of 1
APPLICATION NO. : 10/269210
DATED : September 8, 2009
INVENTOR(S) : Hoberock It is certified that error appears in the above-identified patent and that said Letters Patent is hereby corrected as shown below:

In column 8, line 31, in Claim 13, delete "drawings" and insert -- drawing --, therefor.

Signed and Sealed this

Sixteenth Day of March, 2010

David J. Kappos
*Director of the United States Patent and Trademark Office*